T. L. BURTON.
CLASP BRAKE RIGGING.
APPLICATION FILED SEPT. 17, 1913.
1,097,912.
Patented May 26, 1914.
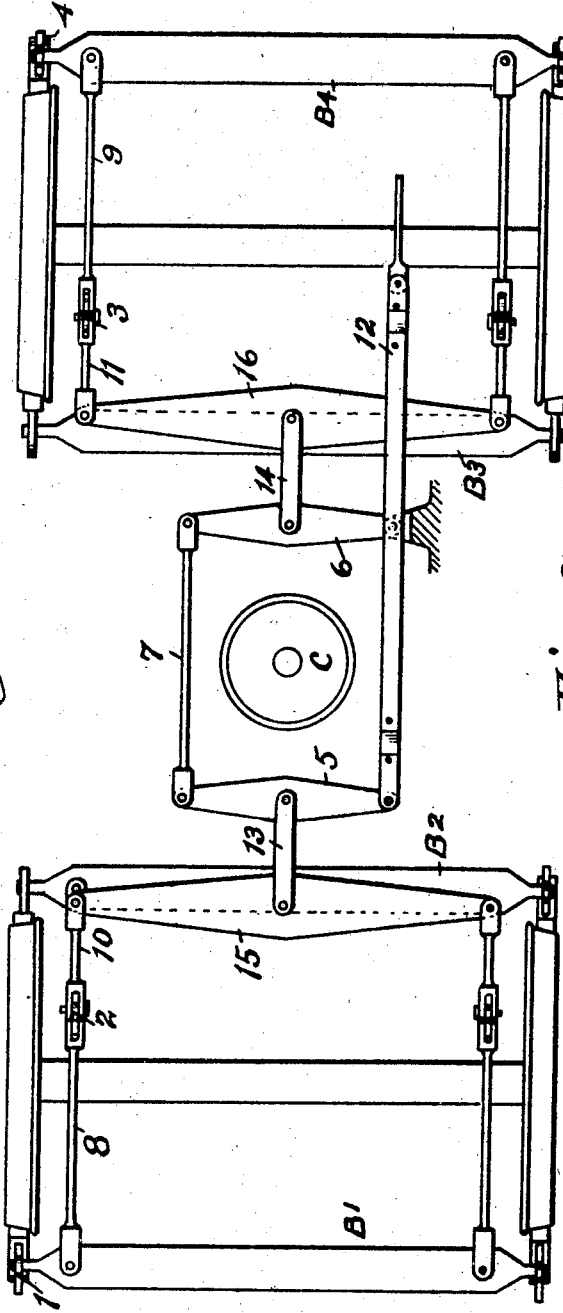
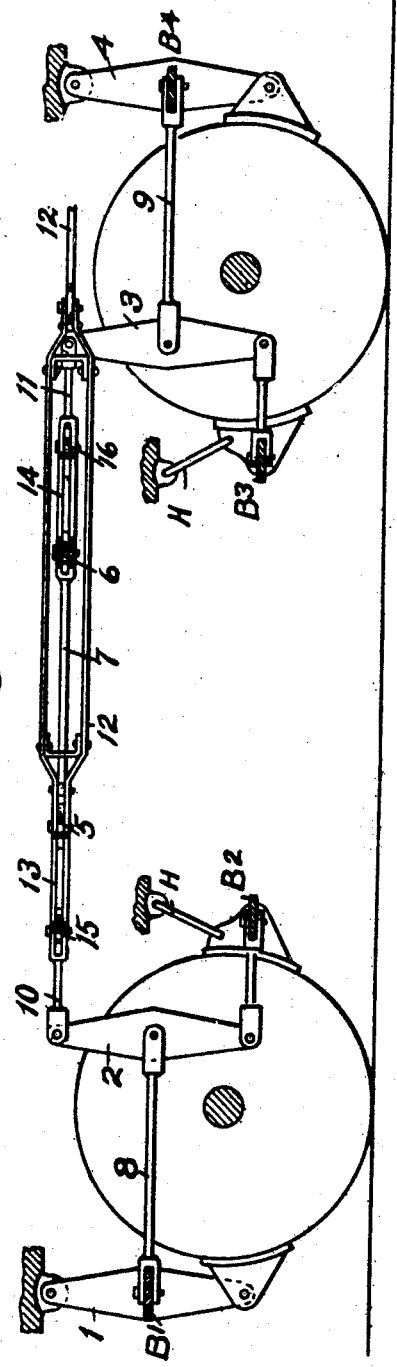
WITNESSES:
INVENTOR
Thomas L. Burton
BY
Edward Wright
ATTORNEY

UNITED STATES PATENT OFFICE.

THOMAS L. BURTON, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

CLASP BRAKE-RIGGING.

1,097,912.  Specification of Letters Patent.  Patented May 26, 1914.

Application filed September 17, 1913. Serial No. 790,151.

*To all whom it may concern:*

Be it known that I, THOMAS L. BURTON, a citizen of the United States, residing at Pittsburgh, in the county of Allegheny and State of Pennsylvania, have invented a certain new and useful Improvement in Clasp Brake-Rigging, of which improvement the following is a specification.

This invention relates to railway brake rigging of the clasp type, in which brake shoes are applied to both sides of each pair of truck wheels, the principal object being to provide an improved construction of this type in which a double set of truck levers and rods are employed, one at each side of the truck, and having a pair of intermediate levers near the center of the truck, with equalizers connected to the respective intermediate levers for actuating the two sets of truck rods and levers.

In the accompanying drawings: Figure 1 is a plan of one form of clasp type brake applied to a four wheeled truck, and embodying my improvement; and Fig. 2 a longitudinal sectional view of the same, showing one set of truck rods and levers in elevation.

According to the construction shown in the drawings, the improvement is applied to a four wheeled truck having brake beams, $B^1$, $B^2$, $B^3$ and $B^4$, at both sides of each pair of wheels, and two sets of truck levers 1, 2, 3, and 4, with coupling rods 8 and 9, these parts being duplicated upon opposite sides of the truck. The live truck levers, 2 and 3, are pivotally connected at their lower ends to the brake beams, $B^2$ and $B^3$, having brake shoes at their ends, supported by hangers, H, while the dead truck levers, 1 and 4, are pivotally connected to the respective brake beams, $B^1$ and $B^4$, and carry brake shoes at their lower ends.

According to my present improvement, a pair of intermediate levers, comprising the floating lever, 5, and fixed fulcrum lever, 6, connected by rod, 7, are located upon opposite sides of the center plate C, said levers being connected by the respective links, 13 and 14, with the equalizers, 15 and 16, which are attached at their opposite ends to the rods, 10 and 11, respectively, for actuating the two sets of truck levers upon both sides of the truck. By means of this construction, including the equalizers, 15 and 16, the design is simplified and the number of parts reduced.

The power is applied to the floating lever, 5, by a brake cylinder pull rod, 12, which may be split to provide an opening through which the lever, 6, and the equalizer, 16, may extend in order that all of these parts may be located in substantially the same horizontal plate if desired. The power is then transmitted from the intermediate levers, 5 and 6, in opposite directions through the respective equalizer bars, 15 and 16, to the truck levers, and applies all of the brake shoes with equalized pressure.

Having now described my invention, what I claim as new and desire to secure by Letters Patent is:

1. In a brake rigging for pivoted trucks having a plurality of pairs of wheels, the combination with brake shoes applied to both sides of each pair of wheels, and a double set of truck levers and rods, one at each side of the truck, of equalizers connected to said truck levers, and an intermediate floating lever located near the center of the truck and having connections extending in opposite direction to said equalizers.

2. In a brake rigging for pivoted trucks having a plurality of pairs of wheels, the combination with brake shoes applied to both sides of each pair of wheels, and a double set of truck levers and rods, one at each side of the truck, of equalizers connected to said truck levers, an intermediate floating lever having a link connection to one of said equalizers, another intermediate lever having a link connection to another equalizer, and a rod connecting said intermediate levers.

3. In a brake rigging for pivoted trucks having a plurality of pairs of wheels, the combination with brake shoes applied to both sides of each pair of wheels, and a double set of truck levers and rods, one at each side of the truck, of equalizers connected to said truck levers, an intermediate floating lever having a link connecting its middle portion to the central point of one of said equalizers, an intermediate lever having a fixed fulcrum at one end and a link connection to the central point of another equalizer, and a rod connecting said intermediate levers.

In testimony whereof I have hereunto set my hand.

THOMAS L. BURTON.

Witnesses:
J. SNOWDEN BELL,
EDWARD A. WRIGHT.